(12) United States Patent
Layton

(10) Patent No.: US 12,378,985 B1
(45) Date of Patent: Aug. 5, 2025

(54) RACK FOR SUPPORTING ELECTRONIC DEVICES

(71) Applicant: Richard L. Layton, Denver, CO (US)

(72) Inventor: Richard L. Layton, Denver, CO (US)

( * ) Notice: Subject to any disclaimer, the term of this patent is extended or adjusted under 35 U.S.C. 154(b) by 0 days.

(21) Appl. No.: 19/077,021

(22) Filed: Mar. 11, 2025

(51) Int. Cl.
*F16B 12/44* (2006.01)
*A47F 7/00* (2006.01)

(52) U.S. Cl.
CPC ............ *F16B 12/44* (2013.01); *A47F 7/0042* (2013.01)

(58) Field of Classification Search
CPC ........ F16M 11/22; F16M 11/10; F16M 13/00; A47B 23/044; A47B 81/00; A47B 47/0066; A47B 23/04; A47F 7/0042; A47F 2005/165; F16B 12/44
See application file for complete search history.

(56) References Cited

U.S. PATENT DOCUMENTS

| | | | | |
|---|---|---|---|---|
| 1,448,338 A * | 3/1923 | Drew | ................... | B65D 85/305 |
| | | | | 248/314 |
| 2,956,687 A * | 10/1960 | Robichaud | ......... | B65D 81/1075 |
| | | | | 206/217 |
| 4,684,027 A | 8/1987 | Wright | | |
| 5,447,243 A * | 9/1995 | Graber | ................. | B43M 99/008 |
| | | | | 211/13.1 |
| 5,685,423 A | 11/1997 | Hunt | | |
| D404,957 S | 2/1999 | Cheris et al. | | |
| 5,947,276 A * | 9/1999 | Hsu | ..................... | B43M 99/006 |
| | | | | 206/214 |
| 6,059,123 A | 5/2000 | Cotutsca | | |
| 6,412,735 B1 * | 7/2002 | Mathieu | ................... | A47K 1/09 |
| | | | | 248/110 |
| 6,464,076 B2 * | 10/2002 | Tan | ........................ | A63B 55/40 |
| | | | | 206/315.6 |
| 6,929,223 B2 | 8/2005 | Hancock et al. | | |
| 7,503,459 B2 * | 3/2009 | Grayson | ............... | A47F 7/0028 |
| | | | | 211/70.8 |
| 8,717,759 B2 | 5/2014 | Crosby et al. | | |
| 9,317,081 B2 | 4/2016 | Mundt et al. | | |
| 10,004,361 B2 * | 6/2018 | Beebe | .................. | F16M 13/022 |
| 10,067,542 B2 | 9/2018 | Amin-Shahidi et al. | | |
| 10,249,343 B2 | 4/2019 | Chiu | | |
| D858,155 S | 9/2019 | Xu | | |

(Continued)

FOREIGN PATENT DOCUMENTS

| | | |
|---|---|---|
| BE | 1016996 A3 | 2/1912 |
| CA | 2087687 A1 | 7/1993 |

(Continued)

OTHER PUBLICATIONS

Carter Wilson Workshop. SSD Organizer—Solid State Drive Organizer—Hard Drive Holder—SSD Organizer—SSD Stand—14 Colors Available. https://www.etsy.com/listing/1640111904/ssd-organizer-solid-state-drive?click_key=dbd96918d68db17f7c5c1ce0c148d9231ad05aa8%3A1640111904&click_sum=95cb2a7c&ref=shop_home_active_6&crt=1.

(Continued)

*Primary Examiner* — Ko H Chan
(74) *Attorney, Agent, or Firm* — Stephen B. Katsaros; Patent Engineering, LLC

(57) ABSTRACT

A support rack for supporting electronic devices, comprising a base, two legs, and at least one compliant assembly with elastically biased fins that support the electronic device(s). The rack accommodates electronic devices of different sizes while preventing unwanted movement.

14 Claims, 15 Drawing Sheets

(56) References Cited

U.S. PATENT DOCUMENTS

| | | | |
|---|---|---|---|
| 11,011,207 B1 | 5/2021 | Lu | |
| 11,202,503 B1 * | 12/2021 | Diaz | F16M 11/22 |
| 2002/0115495 A1 * | 8/2002 | Tan | A63B 55/00 |
| | | | 206/315.6 |
| 2002/0162761 A1 | 11/2002 | Morgenstern | |
| 2003/0042282 A1 | 3/2003 | Gates et al. | |
| 2004/0113041 A1 | 6/2004 | Hancock | |
| 2006/0151674 A1 | 7/2006 | Hancock | |
| 2008/0030110 A1 | 2/2008 | Yu | |
| 2010/0108547 A1 | 5/2010 | Mender | |
| 2011/0214324 A1 * | 9/2011 | White | B23P 19/00 |
| | | | 156/60 |
| 2012/0037579 A1 * | 2/2012 | Muldoon | F41A 23/18 |
| | | | 211/64 |
| 2012/0050978 A1 | 3/2012 | Lai | |
| 2012/0205497 A1 | 8/2012 | Hunt et al. | |
| 2016/0352118 A1 * | 12/2016 | Huang | H02J 7/0042 |
| 2018/0055166 A1 * | 3/2018 | Rodriguez | F16M 11/041 |
| 2019/0344727 A1 * | 11/2019 | Winkler | B60R 11/06 |
| 2020/0063413 A1 * | 2/2020 | Coy | E03C 1/22 |
| 2020/0333839 A1 * | 10/2020 | Vidyasagaran | A47B 19/10 |
| 2022/0163057 A1 * | 5/2022 | Chen | F16B 12/44 |
| 2022/0171430 A1 * | 6/2022 | Liu | H04B 1/3877 |

FOREIGN PATENT DOCUMENTS

| | | |
|---|---|---|
| CN | 104615212 A | 5/2015 |
| EP | 1151436 B1 | 4/2003 |
| EP | 1304066 A1 | 4/2003 |
| EP | 0873071 B1 | 9/2007 |
| EP | 3989686 A1 | 4/2022 |
| WO | 2013072670 A1 | 5/2013 |

OTHER PUBLICATIONS

NorthWestRnD. Samsung T7 SSD holder for T7 & T7 shield SSD Holder Organizer Stand Solid State Drive Organizer. https://www.etsy.com/listing/1559125824/samsung-t7-ssd-holder-for-t7-t7-shield?ga_order=most_relevant&ga_search_type=all&ga_view_type=gallery&ga_search_query=seagate+hard+drive+rack&ref=sc_gallery-1-5&plkey=be58fed1d98feda42e875919ea485e624129077f%3A1559125824.

* cited by examiner

RACK FOR SUPPORTING ELECTRONIC DEVICES

TECHNICAL FIELD

This disclosure pertains, but not by way of limitation, to the organization and management of electronic devices. Specifically, this disclosure relates to the field of a rack to support and accommodate electronic devices.

BACKGROUND

Electronic devices such as portable hard drive racks encounter several challenges, including poor cable management, resulting in tangled wires and cluttered workspaces. Limited accessibility may hinder their frequent use, while inadequate ventilation can cause overheating, reducing drive longevity. Furthermore, a lack of stability or padding increases the risk of accidental falls. Additionally, size constraints may limit compatibility with different external hard drive models, affecting versatility of the device.

SUMMARY

A rack is disclosed and designed to support an electronic device securely. The rack may include a base with opposing top and bottom surfaces and two legs extending from the base to define a gap between them. The rack may further include a compliant assembly with a plate and integrated fins, which provides flexibility, allowing the fins to adjust when the device is inserted and return to their original position when removed. This configuration enables adaptive and secure support, ensuring stability while accommodating varying device sizes.

In an illustrative configuration, a support rack is disclosed. The support rack is configured to support a first electronic device. The support rack may include: a base may include a base bottom surface; and a base top surface oppositely disposed from the base bottom surface; a first leg may include: a first bottom surface, coplanar to the base bottom surface of the base; a first inside surface; and a first outside surface, oppositely disposed to the first inside surface, where the first leg protrudes from the first bottom surface above the base top surface of the base; a second leg may include: a second bottom surface, coplanar to the base bottom surface of the base and the first bottom surface of the first leg; a second inside surface; a second outside surface, oppositely disposed to the second inside surface; and a second base formed between the second inside surface and the second outside surface; a gap defined by space between the first inside surface of the first leg is offset from the second inside surface of the second leg; a first compliant assembly may include: a first compliant plate may include: a first plate bottom surface coplanar to the first bottom surface of the first leg, the second bottom surface of the second leg, and the base bottom surface of the base; a first plate surface adjoining the first inside surface of the first leg; and a second plate surface oppositely disposed from the first plate surface; and a first plurality of fins, each of the first plurality of fins protruding from the second plate surface of the first compliant plate towards the gap, where the first plurality of fins are integrally formed on the first compliant plate; a supporting condition where: the first plurality of fins are elastically biased towards the first leg via the first electronic device at a first distance from the first leg; and an unsupported condition where: the first plurality of fins are unbiased and at a second distance greater than the first distance form the first leg.

In an illustrative configuration, a supporting method for supporting a first electronic device with a support rack is disclosed. The supporting method may include: providing a base, may include: a base bottom surface; and a base top surface oppositely disposed from the base bottom surface; providing a first leg, may include: a first bottom surface coplanar to the base bottom surface of the base; a first inside surface; and a first outside surface oppositely disposed to the first inside surface, where the first leg protrudes from the first bottom surface above the base top surface of the base; providing a second leg, may include: a second bottom surface coplanar to the base bottom surface of the base and the first bottom surface of the first leg; a second inside surface; a second outside surface oppositely disposed to the second inside surface; and a second base formed between the second inside surface and the second outside surface; providing a gap defined by space between the first inside surface of the first leg is offset from the second inside surface of the second leg; providing a first compliant assembly may include: a first compliant plate may include: a first plate bottom surface, coplanar to the first bottom surface of the first leg, the second bottom surface of the second leg, and the base bottom surface of the base; a first plate surface adjoining the first inside surface of the first leg; and a second plate surface oppositely disposed from the first plate surface; and a first plurality of fins, each of the first plurality of fins protruding from the second plate surface of the first compliant plate towards the gap, where the first plurality of fins are integrally formed on the first compliant plate; and transitioning the first plurality of fins between: a supporting condition may include: biasing elastically, the first plurality of fins towards the first leg via the first electronic device at a first distance from the first leg; and an unsupported condition may include: unbiasing the first plurality of fins at a second distance greater than the first distance form the first leg. Further areas of applicability of the present disclosure will become apparent from the detailed description provided hereinafter. It should be understood that the detailed description and specific examples, while indicating various configurations, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, together with the detailed description, explain the principles of the system. No attempt is made to show structural details in more detail than necessary for a fundamental understanding of the system and the various ways it is practiced. The following figures of the drawing include.

Figure 1:
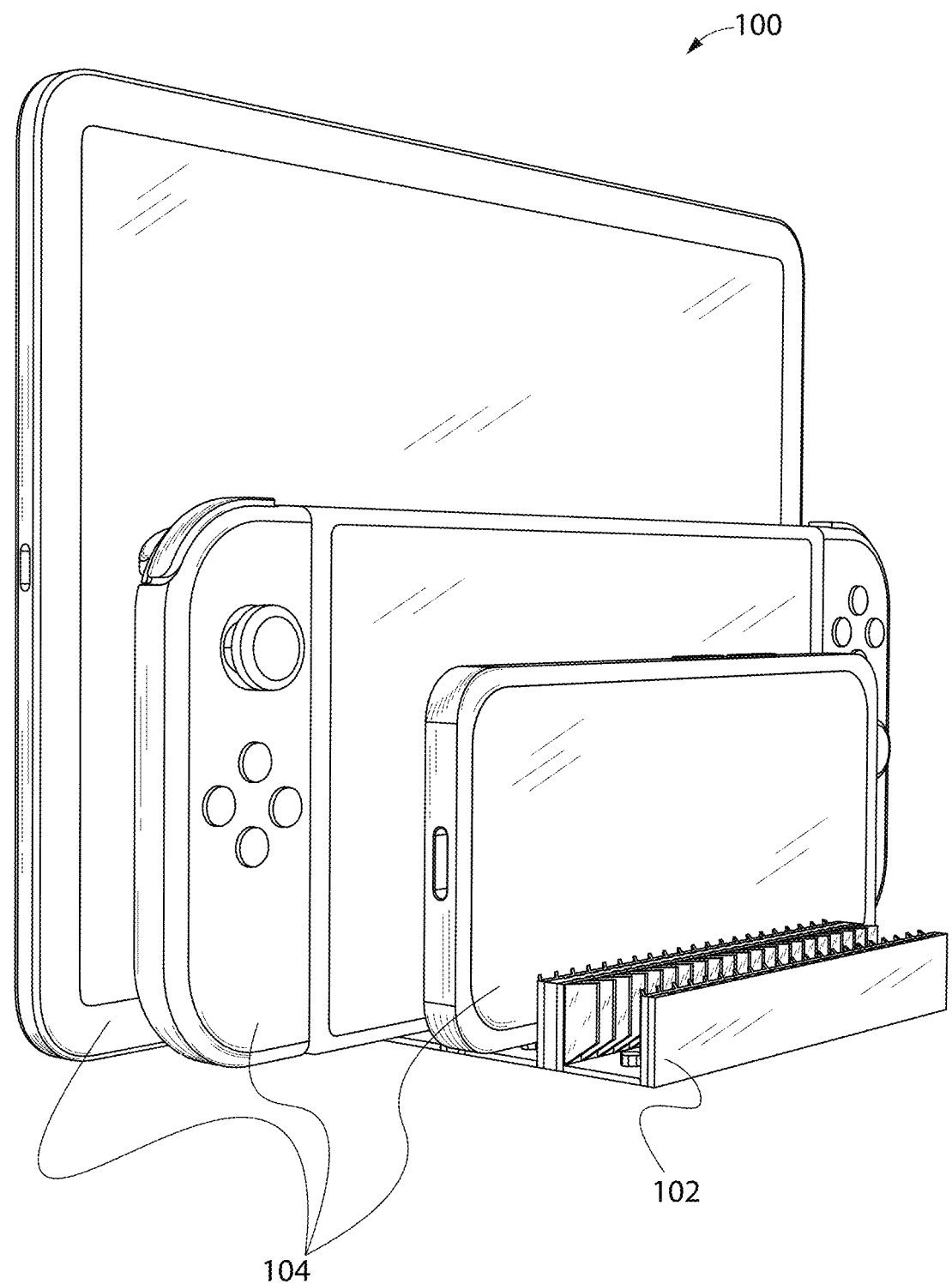
FIG. 1 illustrates a schematic of a rack configured to accommodate one or more electronic devices in a supporting condition.

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label, irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered exemplary only, with the true scope and spirit being indicated by the following claims.

Existing racks or storage cabinets for electronic devices—such as but not limited to tablets, portable gaming consoles, portable hard drives, Solid State Drives (SSDs), and similar items—have several design limitations that affect their functionality and convenience. Such limitations may include inefficient cable management, limited accessibility, poor ventilation, and instability. Inefficient cable management often leads to tangled wires and a cluttered workspace, making it difficult to keep such devices organized. Some racks also have limited accessibility, making frequent insertion and removal of drives cumbersome, particularly for users who regularly swap them for backups or data transfers. Poor ventilation can cause heat buildup, which may shorten the lifespan of hard drives and impact their performance. Additionally, instability is a common issue as racks without or lacking anti-slip features or protective padding are at a higher risk of accidental tipping, which could damage the drives. Size limitations further restrict compatibility, preventing certain racks from accommodating different external hard drive models.

The present disclosure relates to a rack for accommodating electronic devices to enhance usability and efficiency, with better cable organization, adequate airflow, increased stability, and universal size adaptability. The rack may include a base with top and bottom surfaces and two legs extending from the top to define a gap between them. The rack may further include a compliant assembly with a plate and integrated fins, which provides flexibility, allowing the fins to adjust when the device is inserted and return to their original position when removed. The rack or the fins may be configured between a supporting condition and an unsupported condition. In the supporting condition, the fins are elastically biased towards the first leg via the electronic device at a first distance from the first leg. In contrast, in an unsupported condition, the fins are unbiased at a second, greater distance than the first distance. The present disclosure explains the rack and configurations in detail, in conjunction with FIGS. 1-13.

FIG. 1 illustrates a schematic 100 of a rack 102 accommodating at least one electronic device 104 in a supporting condition. The rack 102 may include a base configured to provide structural support and secure at least one electronic device 104. Furthermore, the rack 102 may be adapted to accommodate electronic devices 104 of varying thicknesses. For instance, the rack 102 may be configured to receive electronic devices 104, including but not limited to, portable hard drives having a thickness ranging from approximately 7 mm to approximately 15 mm, solid-state drives having a thickness ranging from approximately 5 mm to approximately 10 mm, and similar devices. Various embodiments of the rack 102 for supporting and accommodating the electronic devices 104 are described in further detail herein.

Figure 2:
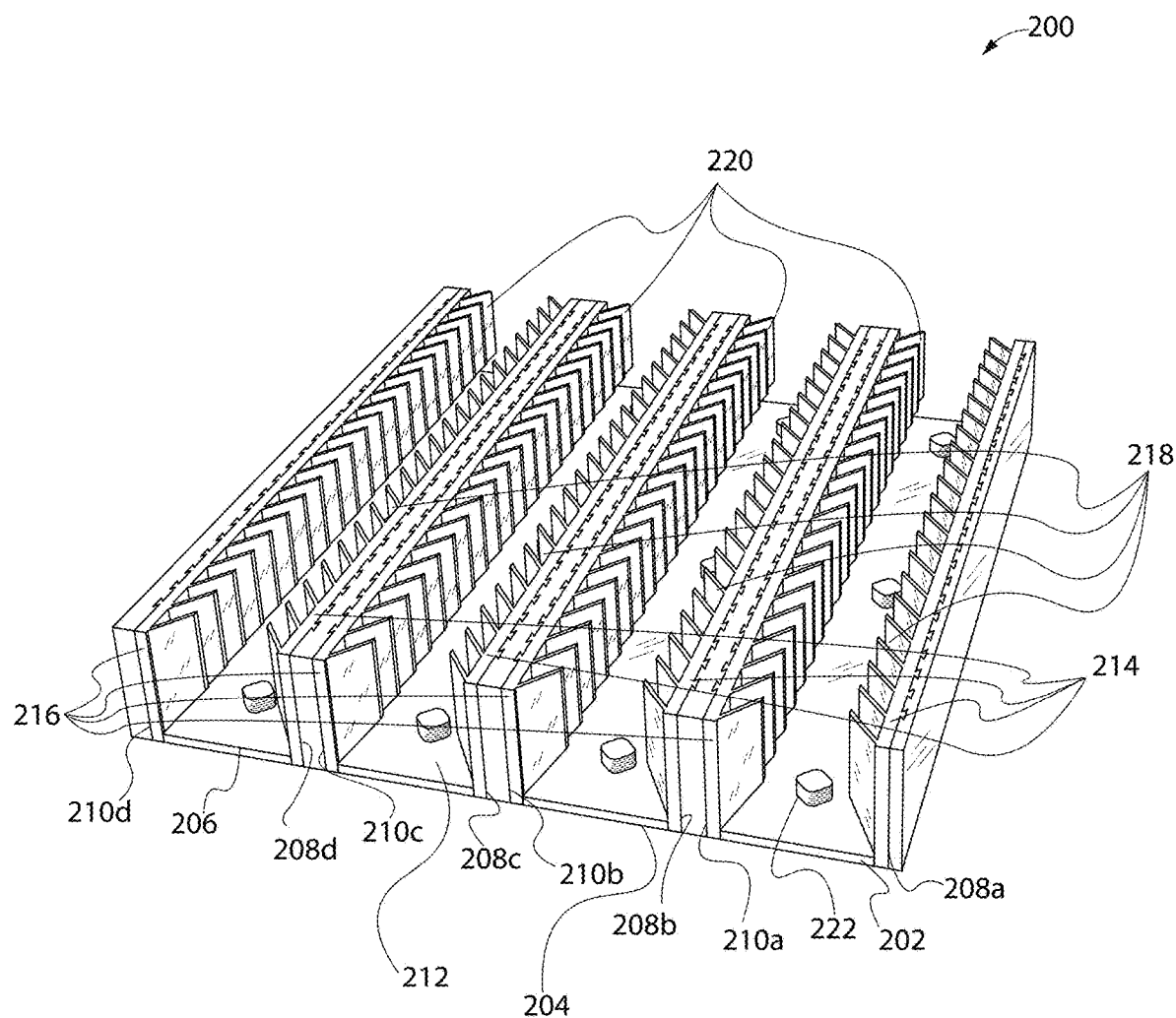
FIG. 2 illustrates a perspective view of the rack.

FIG. 2 illustrates a perspective view 200 of the rack 102. The rack 102 may include a base 202. The base 202 may include a base bottom surface 204 and a base top surface 206. The base top surface 206 may be oppositely disposed to the base bottom surface 204. Further, the rack 102 may include at least one first leg 208a, 208b, 208c, and 208d (hereinafter referred to as first leg 208). Further, the rack 102 may include at least one second leg 210a, 210b, 210c, and 210d (hereinafter referred to as second leg 210). The first leg 208 and the second leg 210 may protrude from the base 202 and may be separated by a gap 212 formed by a space therebetween.

The rack 102 may include a first compliant assembly 214. The first compliant assembly 214 may be interlockingly formed with the first leg 208. Further, the first compliant assembly 214 may include a first plurality of fins 218. The first plurality of fins 218 may be configured to hold and grip the electronic device 104 within the gap 212. Further, to improve the grip of the electronic device within the gap 212, the rack 102 may include a second compliant assembly 216. The second compliant assembly 216 may be formed with the second leg 210. Further, the second compliant assembly 216 may be interlockingly formed with the second leg 210. Moreover, the second compliant assembly 216 may include a second plurality of fins 220. The first plurality of fins 218 and the second plurality of fins 220 may be elastically deformed or biased at a first distance upon supporting with the electronic device 104 in the supporting condition. Conversely, the first plurality of fins 218 and the second plurality of fins 220 may be unbiased at a second distance greater than the first distance in an unsupported condition.

With continued reference to FIG. 2, the rack 102 may include a plurality of standoffs 222. The plurality of standoffs 222 may be formed on the base 202. Further, the plurality of standoffs 222 may be formed of a predefined height ranging from about 5 mm to about 10 mm. As such, in some configurations, the plurality of standoffs 222 may be configured to separate the electronic devices 104 away from the base by a predefined gap. The predefined gap may be equivalent to the height of each standoff from the plurality of standoffs 222.

Figure 3:
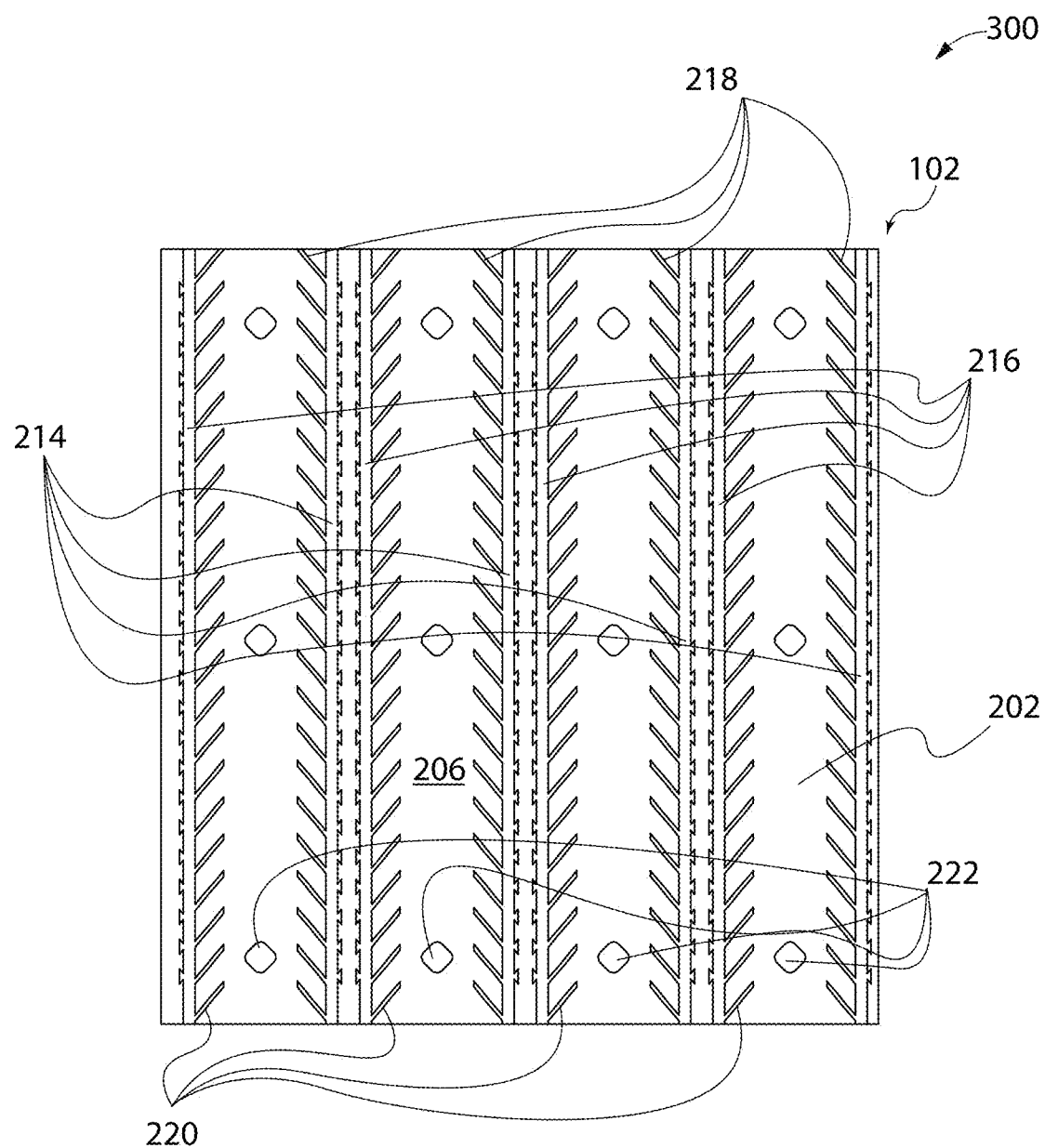
FIG. 3 illustrates a top view of the rack.

FIG. 3 illustrates a top view 300 of the rack 102. As explained earlier, the rack 102 may include the plurality of standoffs 222 formed on the base 202. Particularly, the base 202 may include a plurality of openings formed therein. Further, the plurality of standoffs 222 may be formed in the plurality of openings 302 and protrude from the base top surface 206.

In an illustrative configuration and explained earlier, the first plurality of fins 218 and the second plurality of fins 220 may be formed on the first compliant assembly 214 and the second compliant assembly 216 respectively. Further, the first plurality of fins 218 may be formed at a first predefined orientation relative to the first compliant assembly 214 and may extend towards the second compliant assembly 216. Similarly, the second plurality of fins 220 may be formed at a second predefined orientation relative to the second compliant assembly 216 and may extend towards the first compliant assembly 214. The first predefined orientation may be opposite to the second predefined orientation.

Figure 4:
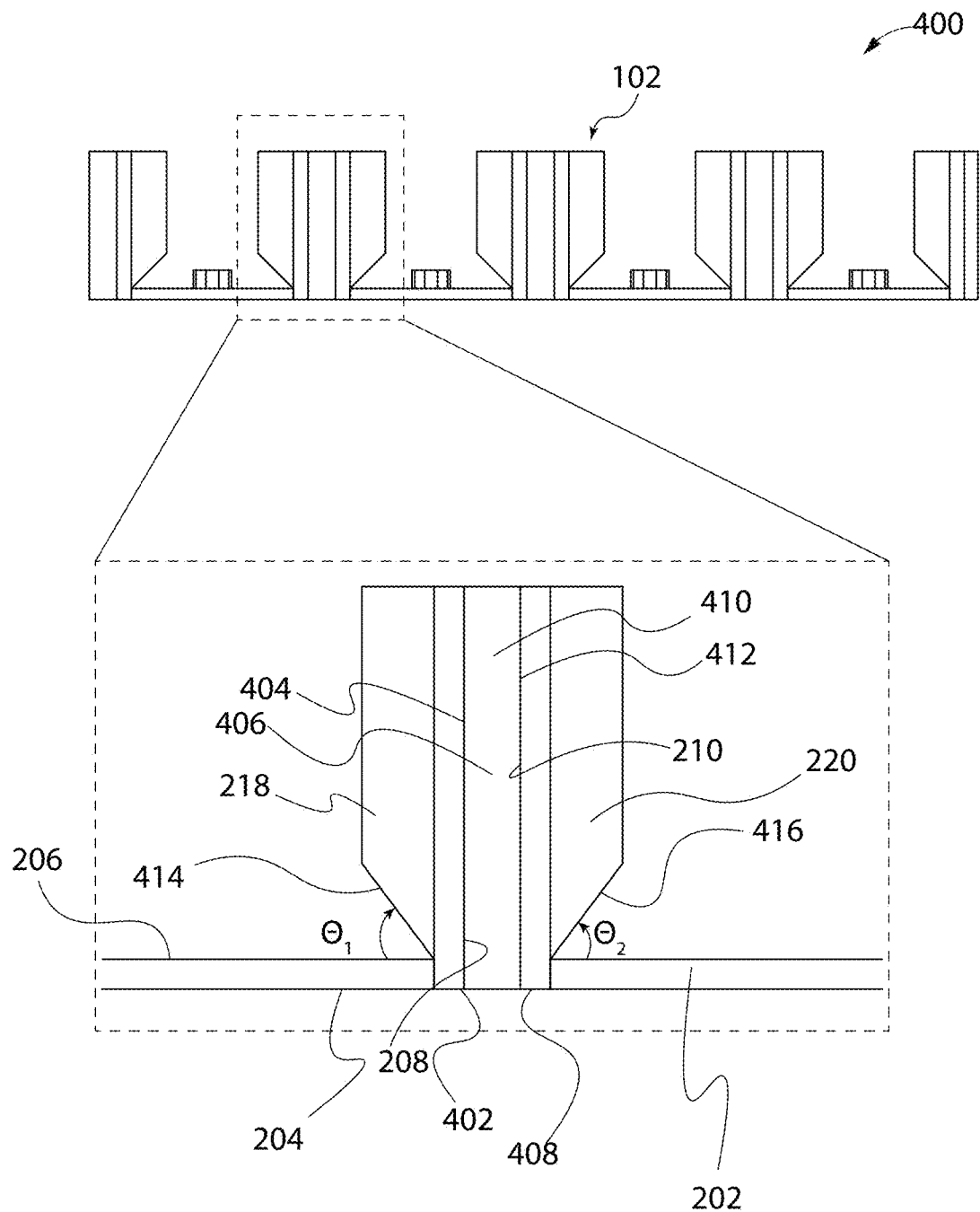
FIG. 4 illustrates a front view of the rack.

FIG. 4 illustrates a front view 400 of the rack 102. As explained earlier, the rack 102 may include the first leg 208 and the second leg 210. Further, each first leg 208 may include a first bottom surface 402, a first inside surface 404, and a first outside surface 406 oppositely disposed to the first inside surface 404. The first bottom surface 402 may be formed coplanar to the base bottom surface 204. Further, each first leg 208 protrudes from the first bottom surface 402 to above the base top surface 206. Moreover, each second leg 210 may include a second bottom surface 408, a second inside surface 410, and a second outside surface 412 oppositely disposed to the second inside surface 410. The second bottom surface 408 may be formed coplanar to the base bottom surface 204. Further, each second leg 210 protrudes from the second bottom surface 408 to above the base top surface 206. Further, the first inside surface 404 may be offset to the second inside surface 410 and formed a space therebetween. The space may be formed as the gap 212.

In an illustrative configuration, each fin from the first plurality of fins 218 may include a first inclined bottom 414. Further, the first inclined bottom 414 may be formed at a first inclined bottom angle $\Theta_1$ relative to the base top surface 206. Particularly, the first inclined bottom angle $\Theta_1$ may be measured in a clockwise direction from the base top surface 206. The inclined bottom angle $\Theta_1$ may be greater than 20° when measured in a clockwise direction from the base top surface 206. Similarly, each fin from the second plurality of fins 220 may include a second inclined bottom 416. Further, the second inclined bottom 416 may be formed at a second inclined bottom angle $\Theta_2$ relative to the base top surface 206. Particularly, the second inclined bottom angle $\Theta_2$ may be measured in a counterclockwise direction from the base top surface 206. The second inclined bottom angle $\Theta_2$ may be greater than 20° when measured in the counterclockwise direction from the base top surface 206.

The first inclined bottom 414 and the second inclined bottom 416 may form a passage of air on the base top surface 206 in the supporting condition. For example, a bottom of the electronic device 104 when accommodated within the rack 102, may be separated from the base top surface 206 by the plurality of standoffs 222 (refer to FIG. 2) by the predefined height. The predefined height, with the first inclined bottom 414 and the second inclined bottom 416, may form a passage to allow circulation of air through, and dissipate heat emitted by the electronic devices 104.

Figure 5:
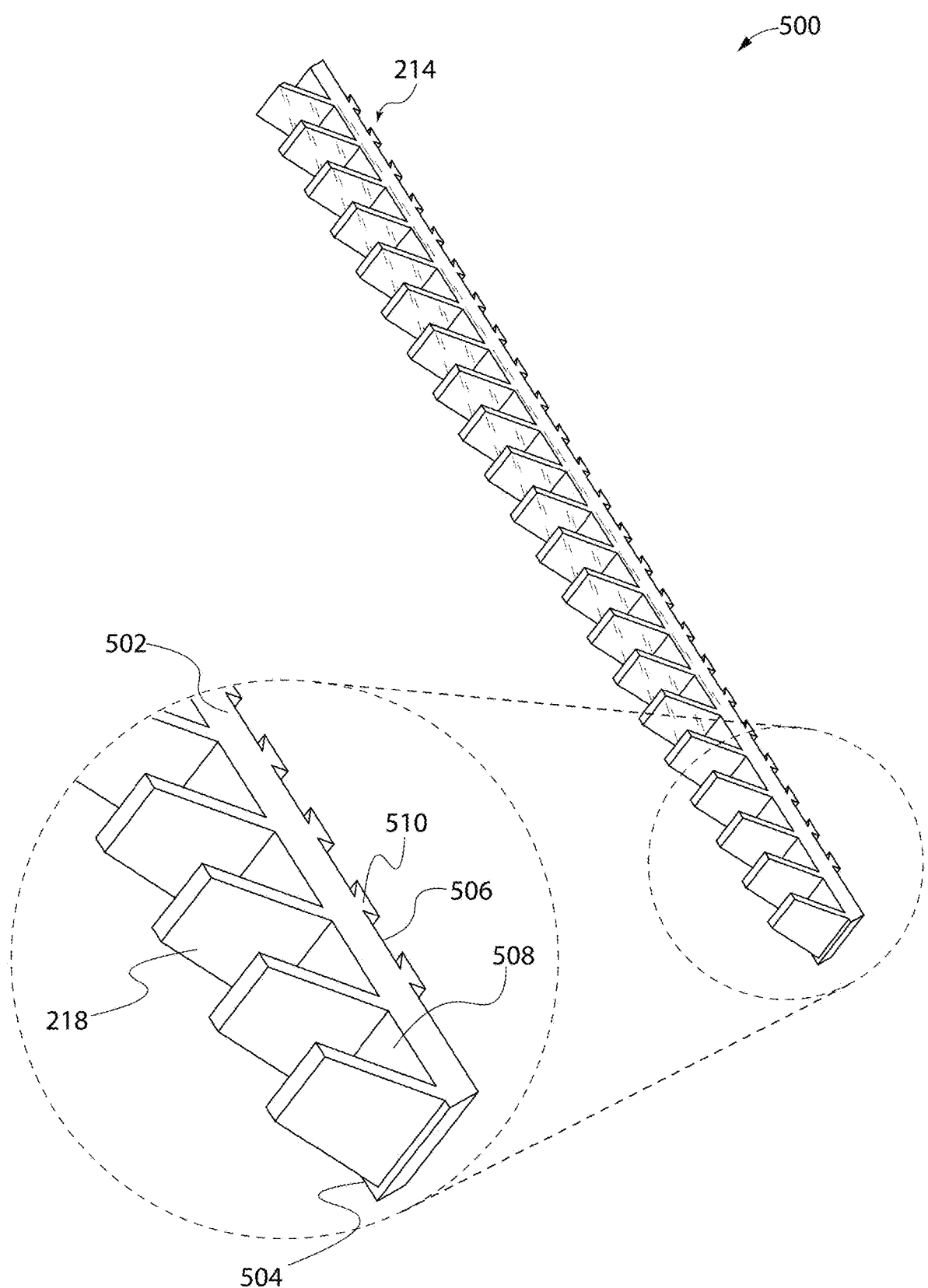
FIG. 5 illustrates a perspective view of the first compliant assembly.
Figure 6:
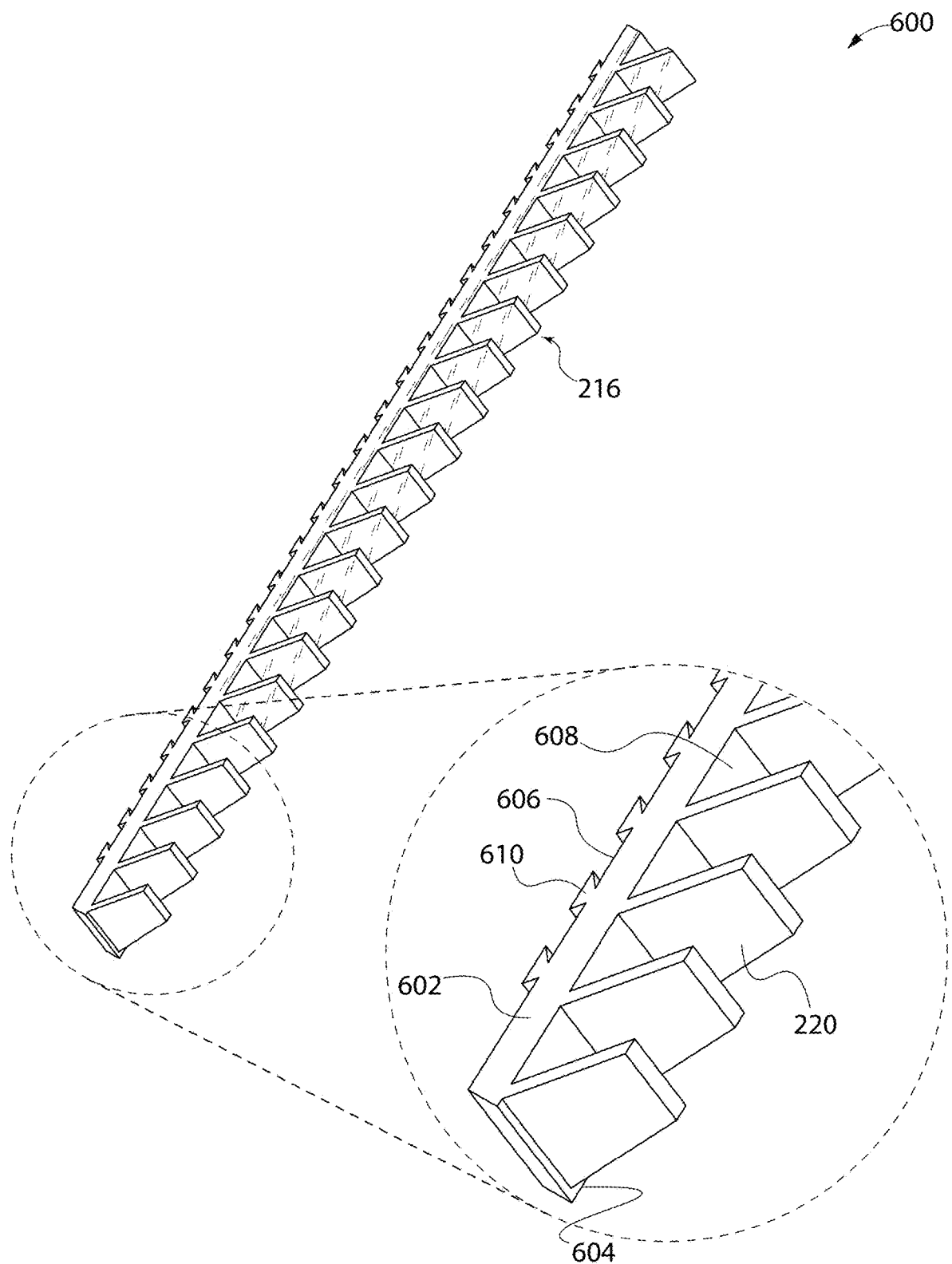
FIG. 6 illustrates a perspective view of the second compliant assembly.

FIG. 5 illustrates a perspective view 500 of the first compliant assembly 214 and FIG. 6 illustrates a perspective view 600 of the second compliant assembly 216. As explained earlier, the first plurality of fins 218 may be integrally formed with the first compliant assembly 214. To further elaborate, the first compliant assembly 214 may include a first compliant plate 502. The first compliant plate 502 may further include a first plate bottom surface 504, a first plate surface 506, and a second plate surface 508. When the first compliant assembly 214 may be formed with the first leg 208, the first plate bottom surface 504 may be coplanar with the first bottom surface 402 and the base bottom surface 204. Further, the first plate surface 506 may adjoin the first inside surface 404 of the first leg 208. As such, in some configurations, the first plurality of fins 218 may be protruded from the second plate surface 508 towards the gap 212.

With reference to FIG. 6, the second plurality of fins 220 may be integrally formed with the second compliant assembly 216. Moreover, the second compliant assembly 216 may include a second compliant plate 602. The second compliant plate 602 may include a second plate bottom surface 604 that is coplanar with the first bottom surface 402 of the first leg 208, the second bottom surface 408 of the second leg, the base bottom surface 204, and the first plate bottom surface 504 of the first compliant plate 502. The second compliant plate 602 may include a third plate surface 606 that adjoins the second inside surface 410 of the second leg 210 and a fourth plate surface 608 positioned opposite the third plate surface 606. Moreover, the second plurality of fins 220 may be protruded from the fourth plate surface 608 towards the gap 212.

As explained earlier, the first compliant assembly 214 may be interlockingly formed with the first leg 208, and the second compliant assembly 216 may be interlockingly formed with the second leg 210. To further elaborate, the first compliant assembly 214 may be integrally formed with the first leg 208 using interlocking features, which may include, but not limited to, dove-tail joint, transition seam, extrusion layering, and the like. For example, in case of the interlocking with dove-tail joint, the first plate surface 506 of the first compliant assembly 214 and the third plate surface 606 of the second compliant assembly 216 may be formed with dove-pins. For example, a first set of dove-pins 510 may be formed on the first plate surface 506, and a second set of dove-pins 610 may be formed on the third plate surface 606. The first set of dove-pins 510 and the second set of dove-pins 610 may be integrally formed with the tails on the first leg 208 and the second leg 210 respectively. Accordingly, the first compliant assembly 214 may be interlockingly formed with the first leg 208, and the second compliant assembly 216 may be interlockingly formed with the second leg 210.

The rack 102 may be transitioned between the unsupported condition and the supporting condition. In the unsupported condition, the electronic device 104 may not be supported within the base 202, and in the supporting condition, the electronic device 104 may support the base 202. As such, in the unsupported condition, the first plurality of fins 218 and the second plurality of fins 220 may be unaltered and may be at an original length. Further, in the supporting condition, the second plurality of fins 220 may be biased or elastically deformed to a deformed length upon contact with the electronic device 104. This is explained hereinafter.

Figure 7:
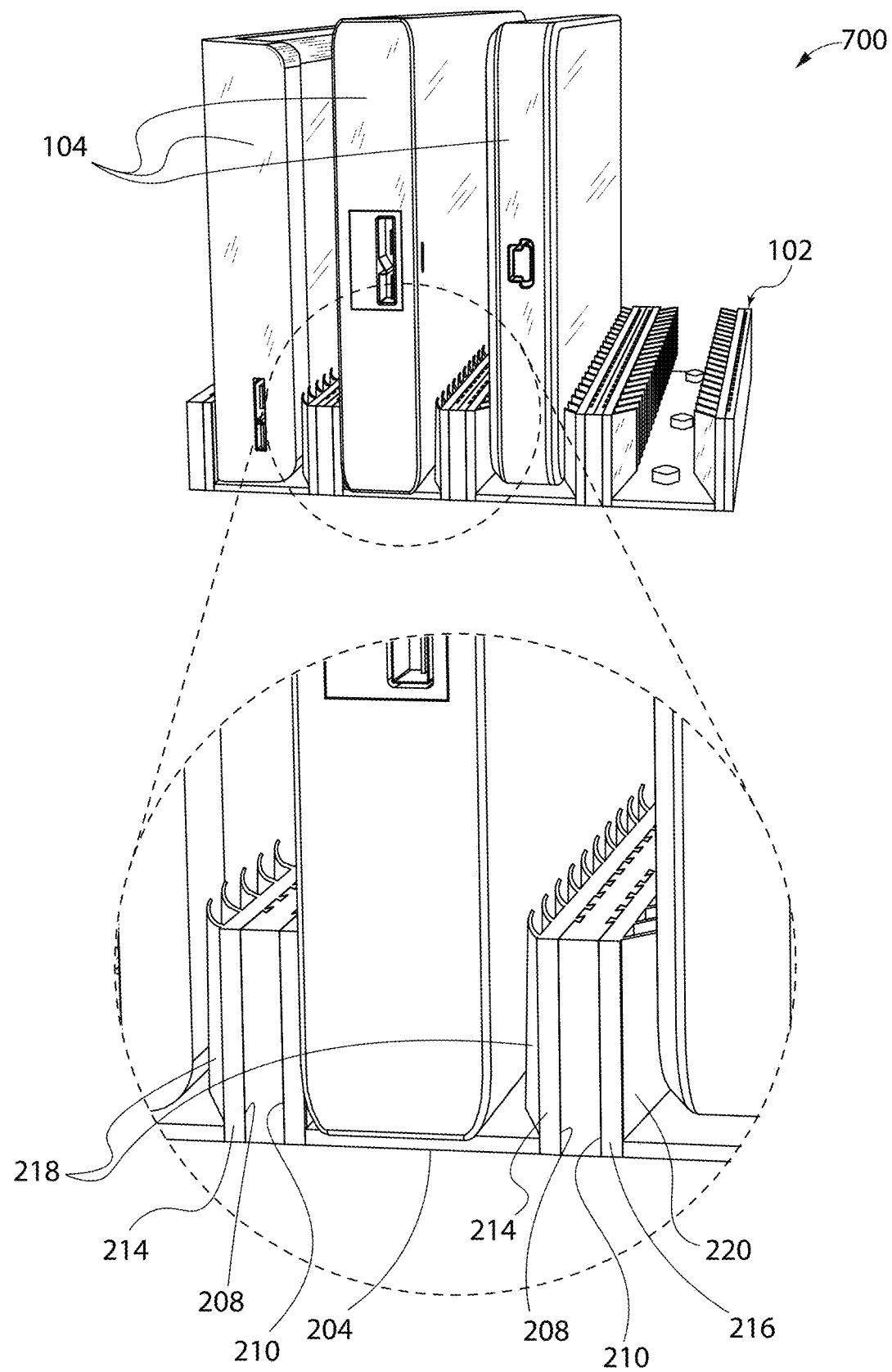
FIG. 7 illustrates a perspective view of the rack in the supporting condition.

FIG. 7 illustrates a perspective view 700 of the rack 102 in the supporting condition. As illustrated, in the supporting condition, the electronic device 104 may support the rack 102 and may enter the gap 212 (refer to FIG. 2) between the first leg 208 and the second leg 210. Consequently, the first plurality of fins 218 and the second plurality of fins 220 may be biased or elastically deformed via the electronic device 104 towards the first leg 208 and the second leg 210 respectively.

To further elaborate, the first plurality of fins 218 may be biased towards the first leg 208 by a first distance. When unbiased, or in other words, in the unsupported condition, the first plurality of fins 218 may be extended up to a second distance from the first leg 208. The second distance may be greater than the first distance. Similarly, the second plurality of fins 220 may be biased towards the second leg 210 by a third distance. When unbiased or in unsupported condition, the second plurality of fins 220 may be extended up to a fourth distance from the second leg 210. The fourth distance may be greater than the third distance.

As such, in some configurations, a degree of biasing, or a degree of elastic deformation of the first plurality of fins 218 and the second plurality of fins 220 may vary to accommodate various electronic devices 104 of variable thicknesses. For example, for electronic devices 104 with larger thickness supporting the rack 102, the first plurality of fins 218 and the second plurality of fins 220 may be deformed at an extent greater than electronic devices 104 with medium thickness supporting the rack 102. This is explained in detail in conjunction with FIG. 8.

Figure 8:
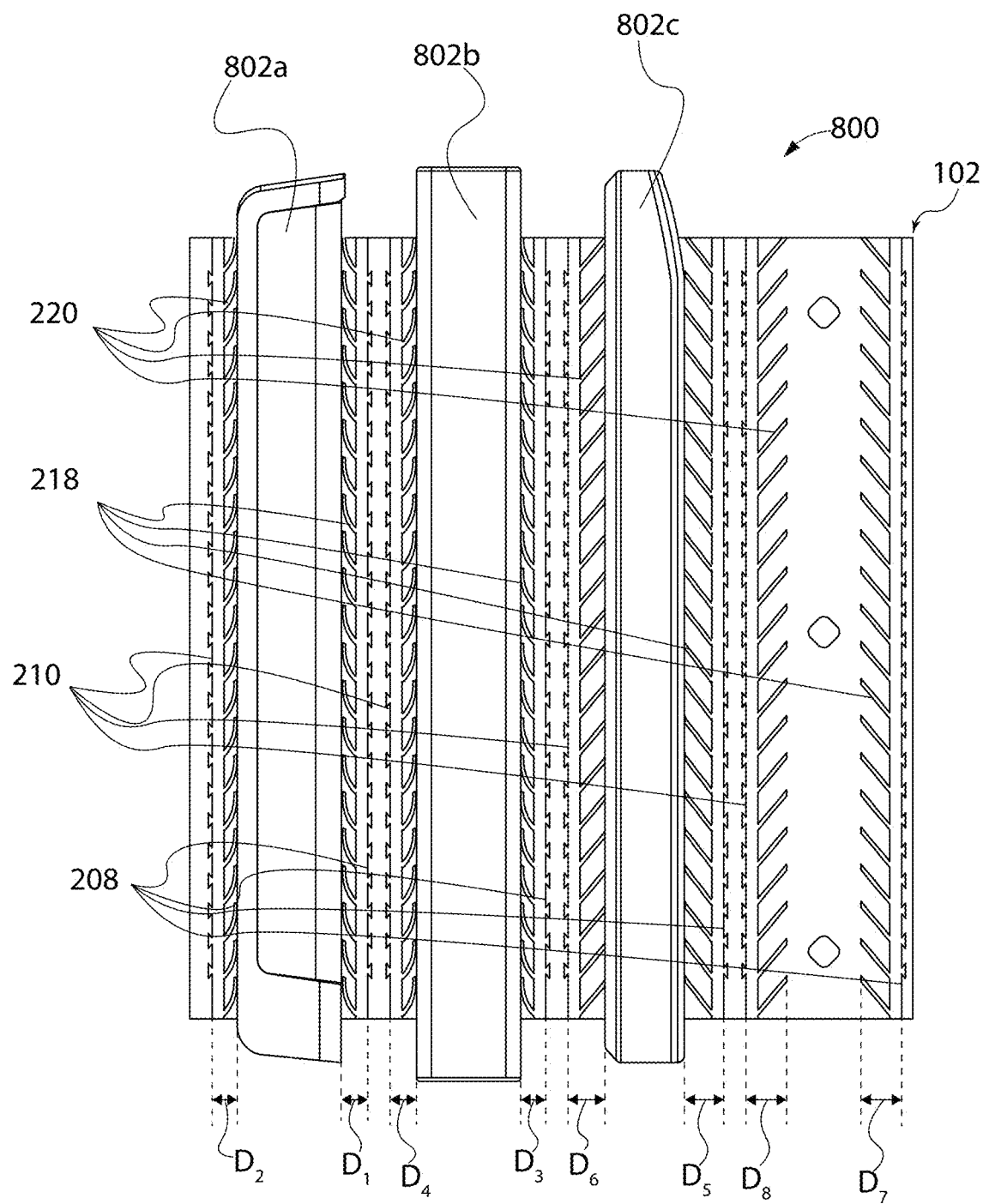
FIG. 8 illustrates a top view of the rack in the supporting condition.

FIG. 8 illustrates a top view 800 of the rack 102 in the supporting condition. In an illustrative configuration, a first electronic device 802a of a first thickness, a second electronic device 802b of a second thickness, and a third electronic device 802c of a third thickness may support the rack 102. It must be noted, the first thickness may be greater than the second thickness, and the second thickness may be greater than the third thickness.

The first electronic device 802a, when supporting the rack 102, may be configured to deform each fin of the first plurality of fins 218 and the second plurality of fins 220 up to a distance $D_1$ and $D_2$ from the first leg 208 and the second leg 210 respectively. Similarly, the second electronic device 802b when supporting the rack 102, may be configured to deform each fin of the first plurality of fins 218 and the second plurality of fins 220 up to a distance $D_3$ and $D_4$ from the first leg 208 and the second leg 210 respectively. Further, the third electronic device 802c when supporting the rack 102, may be configured to deform each fin of the first plurality of fins 218 and the second plurality of fins 220 up to a distance $D_5$ and $D_6$ from the first leg 208 and the second leg 210 respectively. Moreover, in the unsupported condition, the first plurality of fins 218 and the second plurality of fins 220 may be unaltered and may be at a distance $D_7$ and $D_8$ from the first leg 208 and the second leg 210 respectively.

With continued reference to FIG. 8, the first electronic device 802a may include a larger thickness. The first electronic device 802a may be configured to bias or elastically deform the first plurality of fins 218 and the second plurality of fins 220. The degree of biasing is greater than the degree of biasing with which the first plurality of fins 218 and the second plurality of fins 220 may be deformed by the second electronic device 802b and third electronic device 802c. Put differently, the first electronic device 802a may deform the first plurality of fins 218 and the second plurality of fins 220 to a greater extent than the deformation caused by the second electronic device 802b and the third electronic device 802c. As a result, the distances $D_1$ and $D_2$ may be less than the distances $D_3$ and $D_4$. For similar reasons, the distances $D_3$ and $D_4$ may be less than the distances $D_5$ and $D_6$. Moreover, the distances $D_7$ and D& may be greater than the distances $D_1$, $D_2$, $D_3$, $D_4$, $D_5$, and $D_6$. Accordingly, such degree of biasing or degree of elastic deformation may allow accommodation of various electronic devices of various thicknesses. Moreover, the rack 102 may be open-ended between the first leg 208 and the second leg 210. Hence, such configuration may prevent entangling and cluttering of wireharness of the electronic devices 104.

The first plurality of fins 218 and the second plurality of fins 220, due to their elastic nature may enable ease in removal of the electronic device 104 from the rack 102, without inflicting damage to the electronic device 104. As such, when the electronic device 104 is removed, the first plurality of fins 218 and the second plurality of fins 220 may be reverted to the unsupported condition.

The rack 102 may be manufactured using a combination of thermoplastic rubber and a rigid thermoplastic material. For example, the base 202, the first leg 208, and the second leg 210 may be formed of rigid thermoplastic material selected from a group that may include, but not limited to polylactic acid (PLA), polyhydroxyalkanoates (PHA), polybutylene succinate (PBS), polybutylene adipate terephthalate (PBAT), and the like. Moreover, the first compliant assembly 214, the second compliant assembly 216, the first plurality of fins 218, and the second plurality of fins 220 may be formed of a thermoplastic rubber selected from a group which may include thermoplastic polyurethane (TPU), thermoplastic elastomer (TPE), thermoplastic vulcanizate (TPV), silicone rubber, polyurethane rubber, polyethylene terephthalate glycol-modified (PETG), and the like. To manufacture the rack 102, additive manufacturing processes such as 3-D printing with dual extruder may be employed over traditional manufacturing processes. This is explained hereinafter.

Figure 9:
FIG. 9 illustrates a side view of the rack.

FIG. 9 illustrates a side view 900 of the rack 102. As explained earlier, additive manufacturing techniques, such as three-dimensional (3D) printing, may be employed to fabricate the base 202, the first leg 208, and the second leg 210 (refer to FIG. 2) from a rigid thermoplastic material, while the first compliant assembly 214, the second compliant assembly 216, the first plurality of fins 218, and the second plurality of fins 220 (refer to FIG. 2) may be formed from a thermoplastic rubber. The integration of these materials presents significant challenges due to their disparate material properties, including poor chemical adhesion, differences in thermal expansion coefficients, and susceptibility to interlayer delamination. Accordingly, various process optimizations may be implemented to ensure robust bonding between the rigid thermoplastic material and the thermoplastic rubber within a single manufacturing process, including adjustments to print parameters, incorporating mechanical interlocking features, controlled extrusion sequencing, and employing specific build plate surface preparation techniques.

Initially, appropriate extrusion temperatures and adhesion strategies may be selected to adhere the rigid thermoplastic material and thermoplastic rubber. As commonly known, rigid thermoplastic material such as PLA, with a melting point in the range of approximately 190° C. to 220° C., exhibits rapid cooling characteristics, resulting in high stiffness but relatively poor interfacial adhesion to the thermoplastic rubber. Conversely, thermoplastic rubber such as TPR, which requires extrusion temperatures of approximately 210° C. to 250° C., remains elastically deformable after deposition, creating an inherent challenge in achieving a stable bond with rigid thermoplastic. Accordingly, during printing, a tuned overlap distance between the materials may be incorporated. For example, the TPR may overlap with the PLA typically within the range from about 0.2 mm to about 0.4 mm to promote adhesion between the extruded thermoplastic strands while mitigating thermal shrinkage-induced delamination. In addition to incorporating the tuned overlap distance between the materials, mechanical interlocking features may also be incorporated at the interface of the rigid thermoplastic and the thermoplastic rubber. Such interlocking features may include, but are not limited to, mushroom heads, dovetail recesses, undercut notches, extruded overlapping, and the like. Such interlocking features may increase interfacial shear strength, reducing the likelihood of material separation under mechanical stress.

To mitigate adhesion failures, proper adhesion of thermoplastic rubber to the build plate should be ensured. Unlike rigid thermoplastic, which readily forms strong van der Waals interactions with conventional build surfaces, thermoplastic rubber exhibits a higher risk for forming a permanent bond with the build plate due to its elastomeric nature and elevated extrusion temperature requirements. Therefore, the selection and preparation of the build plate are crucial to ensuring strong adhesion, thereby preventing curling, detachment, or shifting during the printing process. Hence, the build plate may be selected from a group which may include but is not limited to PEI (Polyetherimide) Build Plates, Textured Glass with Adhesive Coatings, Polypropylene (PP) or Flexible Build Surfaces, Specialized Adhesion Films and Magnetic Sheets, and the like. By selecting an optimal build surface and applying appropriate adhesion techniques, the print defects may be minimized, improving overall print reliability.

Additionally, the surface treatment of the build plate is an essential consideration for preventing delamination of thermoplastic rubber. For example, chemical priming may be used, in which the build surface is treated with a layer of diluted polycarbonate slurry, PVA-based solutions, or TPU-compatible adhesion sprays. These treatments enhance the compatibility of the surface of the build plate with thermoplastic rubber by increasing frictional resistance and preventing first-layer peeling. Alternatively, mechanical texturing of the build plate may be employed, such as laser etching, sandblasting, or micro-abrasion techniques, to introduce microscopic surface roughness on the surface of the build plate, thereby increasing the effective surface area available for adhesion.

Figure 10:
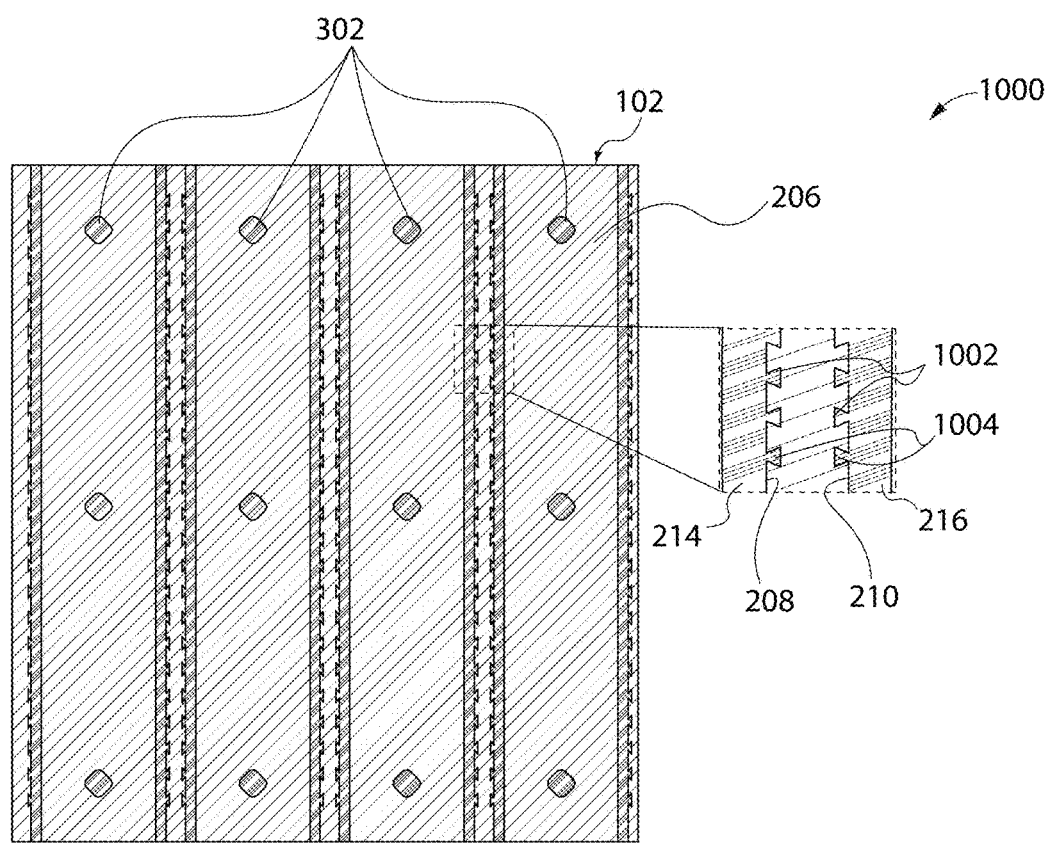
FIG. 10 illustrates a sectional view of the rack taken along section 10-10' in FIG. 9.
Figure 11:
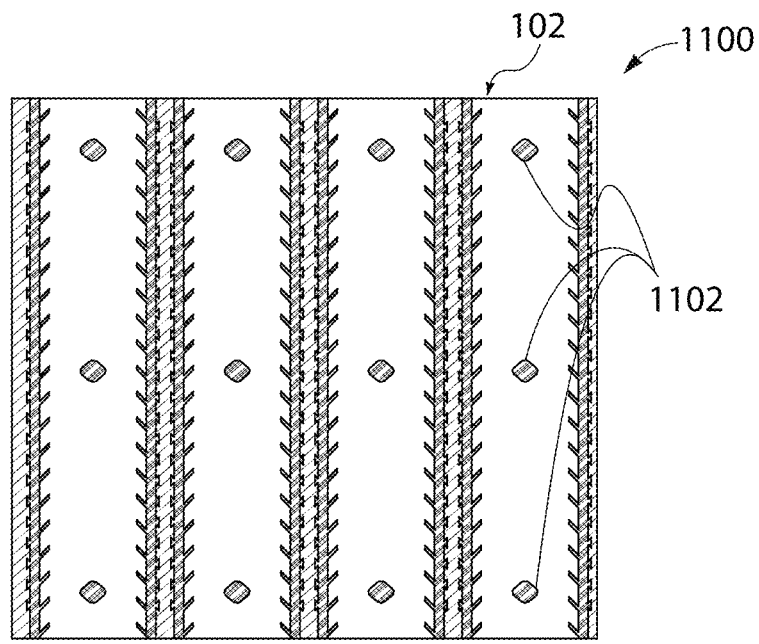
FIG. 11 illustrates a sectional view of the rack taken along section 11-11' in FIG. 9.
Figure 12:
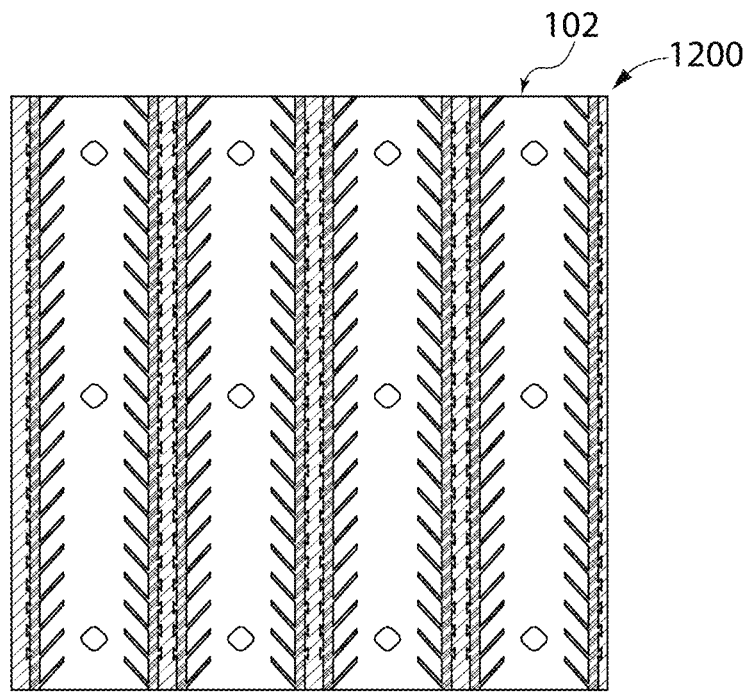
FIG. 12 illustrates a sectional view of the rack taken along section 12-12' in FIG. 9.

FIG. 10 illustrates a sectional view 1000 of the rack 102 taken along section 10-10' in FIG. 9. FIG. 11 illustrates a sectional view 1100 of the rack 102 taken along section 11-11' in FIG. 9, and FIG. 12 illustrates a sectional view 1200 of the rack 102 taken along section 12-12' in FIG. 9. The manufacturing process may be initiated by depositing the thermoplastic rubber to form the first compliant assembly 214, the second compliant assembly 216, the first plurality of fins 218, and the second plurality of fins 220 (refer to FIG. 2). The deposition of the thermoplastic rubber may be followed by immediate deposition of the thermoplastic rigid material to form the rigid thermoplastic to form the base 202, the first leg 208, and the second leg 210 (refer to FIG. 2). Such deposition technique may enable thermal fusion of the thermoplastic rigid material and the thermoplastic rubber in the molten state. Alternatively, if the rigid thermoplastic material may be deposited first, the fan cooling settings of the 3-D printing apparatus may be reduced temporarily during the initial deposition of the thermoplastic rubber, ensuring that the rigid thermoplastic material remains sufficiently warm to enhance bonding with the thermoplastic rubber.

As seen in FIG. 10, initially, as the rigid thermoplastic may be deposited, a plurality of openings 302, the first leg 208, and the second leg 210 may be formed on the base. Moreover, the first leg 208 and the second leg 210 may include a plurality of tails 1002. As the process continues, the thermoplastic rubber may be deposited to form the first compliant assembly 214, the second compliant assembly 216, the first plurality of fins 218 and the second plurality of fins 220. Further, a plurality of dove pins 1004 may be formed with the first compliant assembly 214 and the second compliant assembly 216.

As seen in FIGS. 11-12, after forming the base 202, the plurality of dove pins 1004 may be fused into the plurality of tails 1002 (refer to FIG. 10), thereby adjoining and forming, simultaneously, the first leg 208 and the second leg 210 with the first compliant assembly 214 and the second compliant assembly 216 respectively. Further, a plurality of spacers 1102 may be formed, and located on the plurality of openings 302. Moreover, the plurality of standoffs 222 (refer to FIG. 2) may be formed on the plurality of spacers 1102. Alternatively, instead of the dove-tail joint, the first leg 208 and the second leg 210 may be adjoined with the first compliant assembly 214 and the second compliant assembly 216 respectively, using overlapping extrusion joint as illustrated in FIG. 13.

Figure 13:
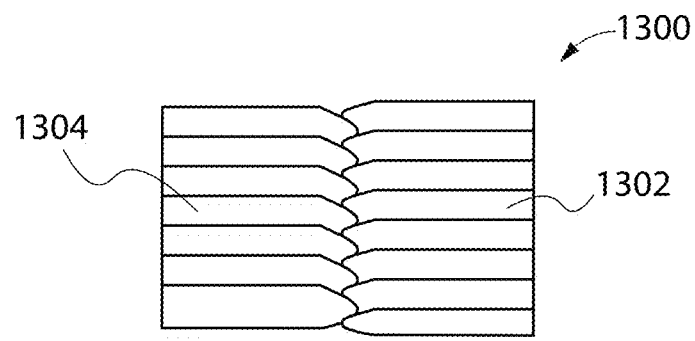
FIG. 13 illustrates a sectional view of the overlapping extrusion joint.

FIG. 13 illustrates a sectional view 1300 of the overlapping extrusion joint. The overlapping extrusion joint facilitates secure engagement of the first leg 208 with both the first compliant assembly 214 and the second leg 210 with the second compliant assembly 216 through a first overlapping feature 1302 and a second overlapping feature 1304. For example, to adjoin the first leg 208 with the first compliant assembly 214, either of the first leg 208 or the first compliant assembly 214 may be formed with first overlapping feature 1302. Further, either of the first leg 208 or the first compliant assembly 214 may be formed with the second overlapping feature 1304. Accordingly, when manufactured, the first overlapping feature 1302 may be extruded in an overlapping manner over the second overlapping feature 1304, thereby adjoining the first leg 208 with the first compliant assembly 214. As may be appreciated, the second leg 210 may be adjoined to the second compliant assembly 216 in a similar manner.

The deposition may be continued at a flow rate increase of 5-10% for thermoplastic rubber to compensate for elasticity-induced under-extrusion. Post-printing, post-processing treatments may be applied to reinforce the bond of the rigid thermoplastic material and the thermoplastic rubber. The post-processing treatments may include, but are not limited to, heat treatment (annealing) at 80° C. to 100° C. for 20 minutes or mechanical reinforcement with polyurethane-based adhesives, cyanoacrylate glues, or solvent-assisted welding techniques using Methyl Ethyl Ketone (MEK), and the like.

Figure 14:
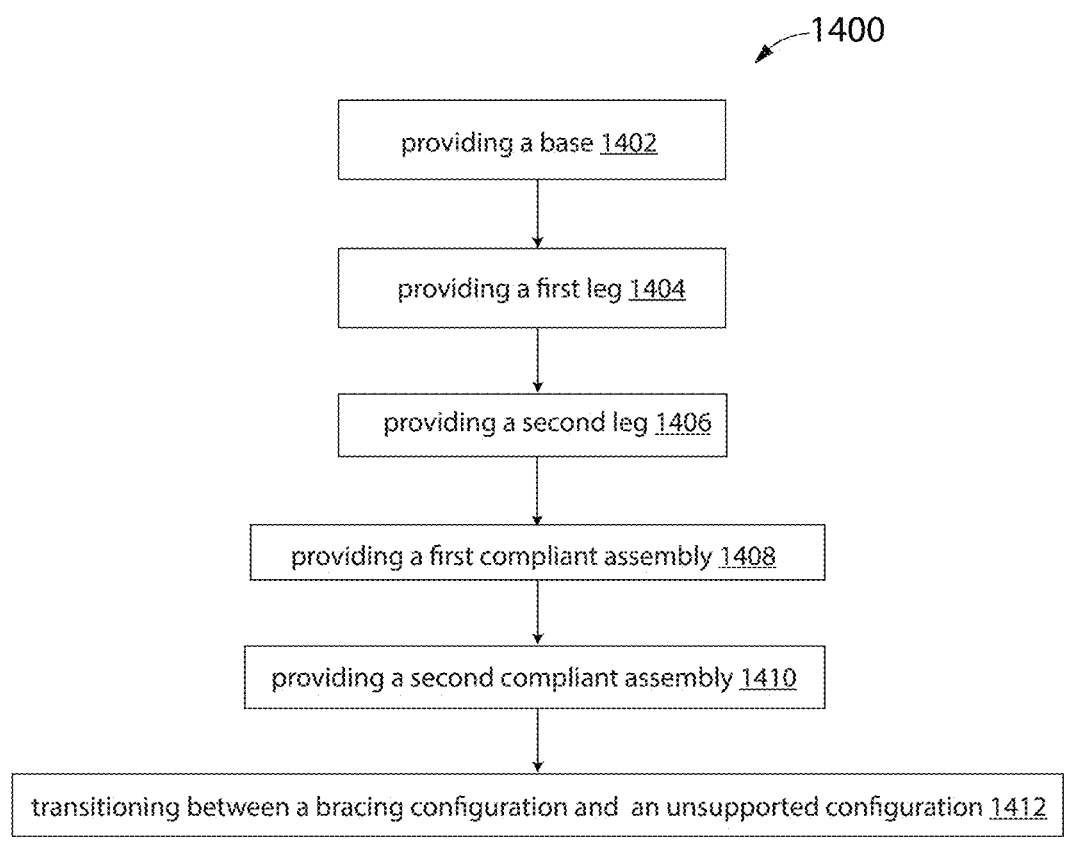
FIG. 14 illustrates a flowchart of a supporting method for supporting an electronic device to the rack.

FIG. 14 illustrates a flowchart 1400 of a supporting method for supporting an electronic device 104 to the rack 102. The supporting method may ensure the electronic device 104 may support and may be accommodated within the rack 102. The supporting method may include a first step 1402, in which a base 202 may be provided. The base may include a base bottom surface 204 and a base top surface 206. The base top surface 206 may be oppositely disposed to the base bottom surface 204.

At step 1404, a first leg 208 may be provided. The first leg 208 may include a first bottom surface 402, a first inside surface 404, and a first outside surface 406 oppositely disposed to the first inside surface 404. The first bottom surface 402 may be formed coplanar to the base bottom surface 204. Further, each first leg 208 protrudes from the first bottom surface 402 to above the base top surface 206.

At step 1406, a second leg 210 may be provided. The second leg 210 may include a second bottom surface 408, a second inside surface 410, and a second outside surface 412 oppositely disposed to the second inside surface 410. The second bottom surface 408 may be formed coplanar to the base bottom surface 204. Further, each second leg 210 protrudes from the second bottom surface 408 to above the base top surface 206. At step 1408, the first inside surface first inside surface 404 of the first leg 208 offset from the second inside surface 410 of the second leg 210 may provide a predefined gap therebetween.

At step 1410, a first compliant assembly 214 may be provided. The first compliant assembly 214 may include a first compliant plate 502. The first compliant plate 502 may further include a first plate bottom surface 504, a first plate surface 506, and a second plate surface 508. When the first compliant assembly 214 may be formed with the first leg 208, the first plate bottom surface 504 may be coplanar with the first bottom surface 402 and the base bottom surface 204. Further, the first plate surface 506 may adjoin the first inside surface 404 of the first leg 208. As such, in some configurations, the first plurality of fins 218 may be extended from the second plate surface 508.

At step 1412, the first plurality of fins 218 may be transitioned between a supporting condition and an unsupported condition. In the supporting condition, the first plurality of fins 218 may be biased towards the first leg 208 via the electronic devices 104 at a first distance from the first leg 208. Further. In the unsupported condition, the first plurality of fins 218 may be biased at a second distance greater than the first distance from the first leg in absence of the electronic device 104.

Figure 15:
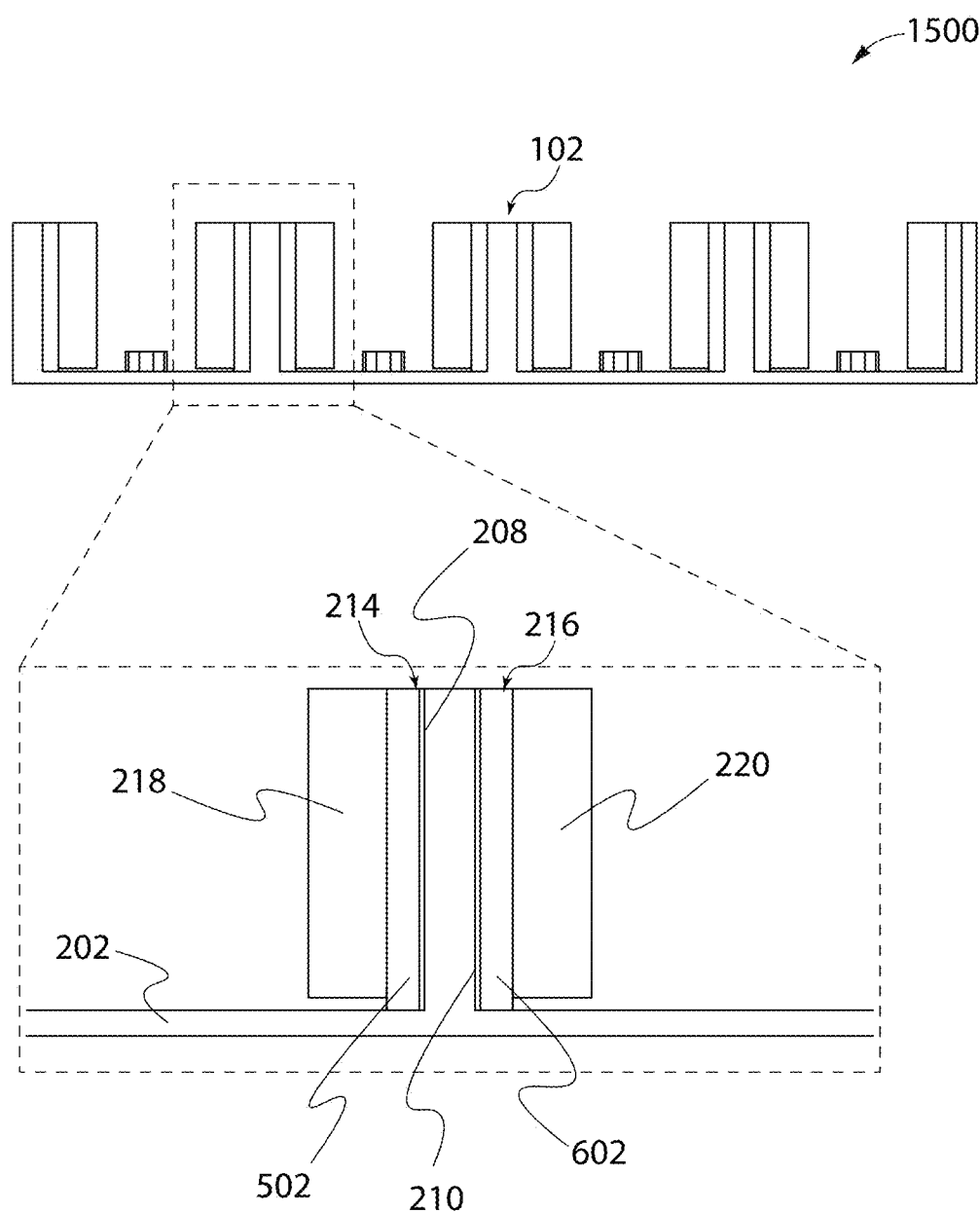
FIG. 15 illustrates a side view of an alternative configuration of the rack.
Figure 16:
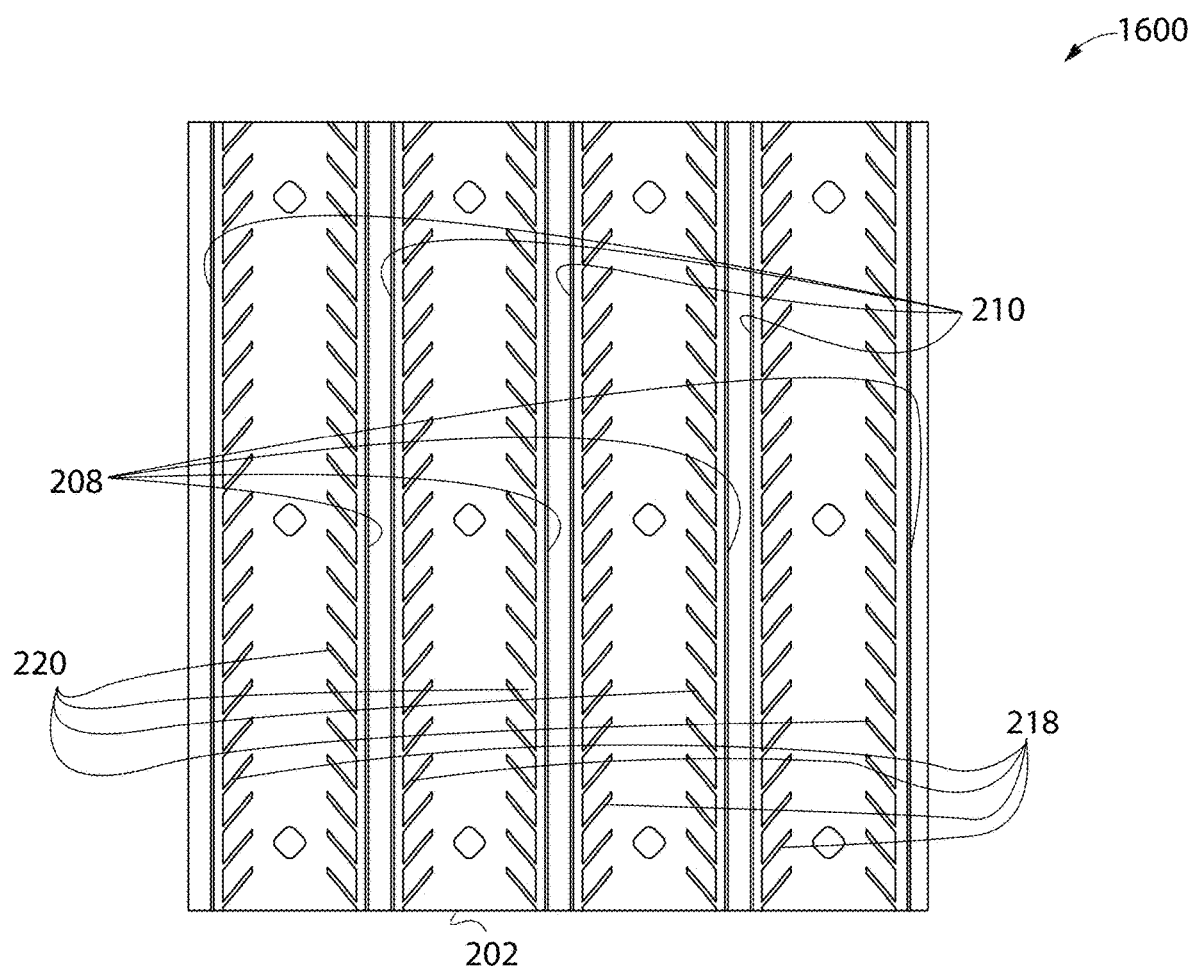
FIG. 16 illustrates a top view of the alternative configuration of the rack illustrated in FIG. 15.

FIG. 15 illustrates a side view 1500 of an alternative configuration of the rack 102. FIG. 16 illustrates a top view 1600 of the alternative configuration of the rack 102 illustrated in FIG. 15. FIGS. 15-16 are explained in conjunction with FIGS. 1-14. In an alternative configuration, the first compliant assembly 214 and the second compliant assembly 216 may be separately manufactured, and adjoined to the first leg 208 and the second leg 210 respectively. Such methodologies are applicable for materials other than thermoplastic rubber and the rigid thermoplastic material. For example, when the base 202 may be made of materials such as but not limited to wood, sheet metal, or polymers using plastic extrusion, and the first compliant assembly 214 and the second compliant assembly 216 may be made of a flexible material. As such, the first compliant assembly 214 and the second compliant assembly 216 may be adjoined to the first leg 208 and the second leg 210 respectively using an interlock. Particularly, the first compliant plate 502 and the second compliant plate 602 of the first compliant assembly 214 and the second compliant assembly 216 may be adjoined to the first leg 208 and the second leg 210 respectively, using an interlock.

The interlock may be configured to adjoin the first compliant plate 502 and the second compliant plate 602 with the first leg 208 and the second leg 210 using one or more interlocking techniques, such as but not limited to an adhesive joint, press fitting, and the like, when the base 202 is manufactured using techniques other than 3-D manufacturing processes. Alternatively, when the base 202 may be manufactured using additive manufacturing such as 3-D printing process, the first compliant assembly 214 and the second compliant assembly 216 may be adjoined with the first leg 208 and the second leg 210 with interlocking techniques such as but not limited to a dove-tail joint, a transition seam, extrusion layering, and the like.

In an alternative configuration, the first plurality of fins 218 and the second plurality of fins 220 may be rectangular shaped, and directly adjoined to the first leg 208 and the second leg 210 respectively. Particularly, the first plurality of fins 218 may be directly adjoined to the first leg 208, and the second plurality of fins 220 may be adjoined to the second leg 210 using similar interlocking technique explained earlier. To further elaborate, the first plurality of fins 218 may be directly adjoined to the first leg 208, and the second plurality of fins 220 may be adjoined to the second leg 210 using an adhesive joint, press fitting, and the like, when the base 202 is manufactured using techniques other than 3-D manufacturing processes. Alternatively, when the base 202 may be manufactured using additive manufacturing such as 3-D printing process, the first plurality of fins 218 may be directly adjoined to the first leg 208, and the second plurality of fins 220 may be adjoined to the second leg 210 with interlocking techniques such as but not limited to a dove-tail joint, a transition seam, extrusion layering, and the like.

Figure 17:
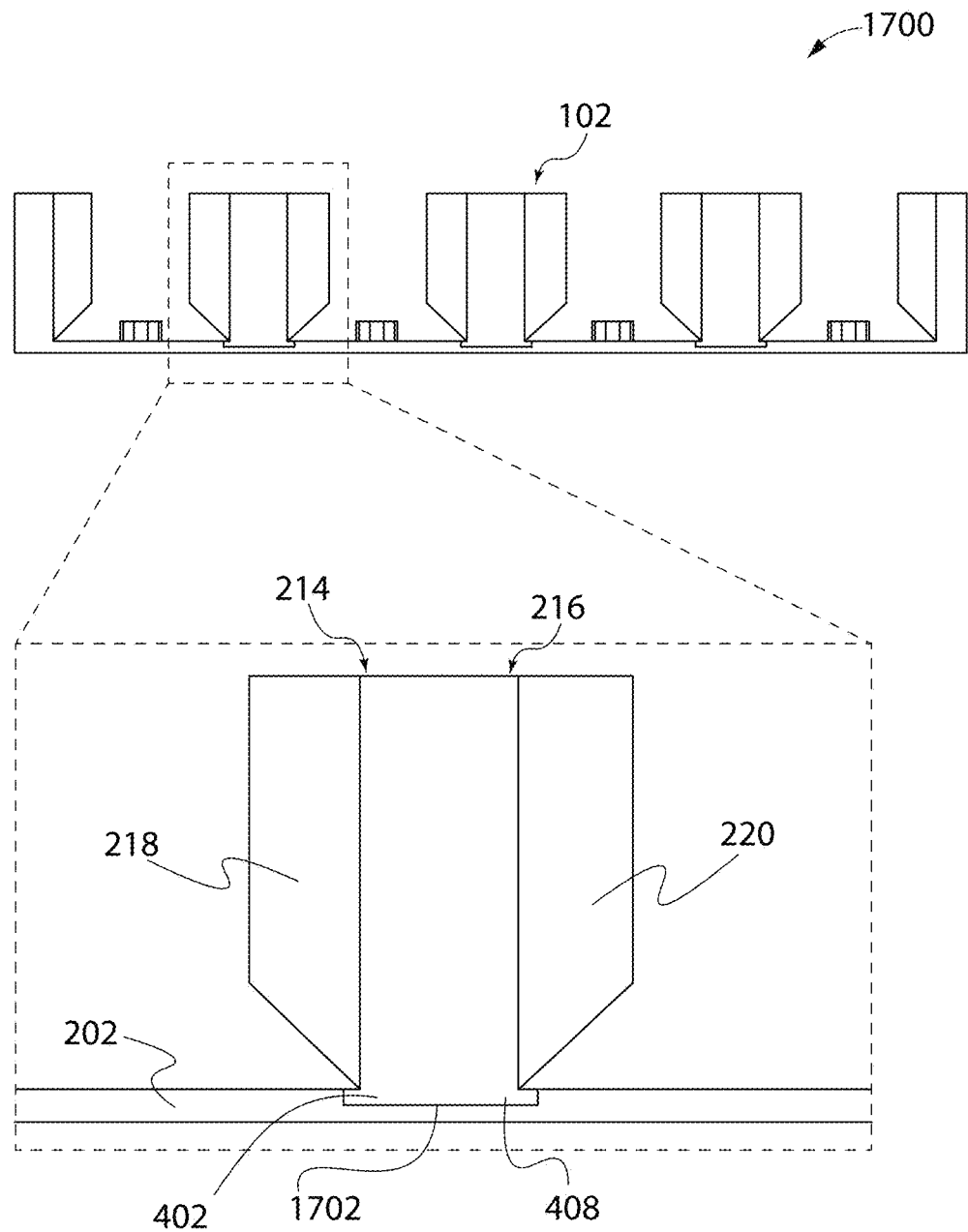
FIG. 17 illustrates a side view of another alternative configuration of the rack.

FIG. 17 illustrates a side view 1700 of another alternative configuration of the rack 102. FIG. 17 is explained in conjunction with FIGS. 1-16. In an alternative configuration, the first leg 208 and the second leg 210 may be separately manufactured and interlocked with the base 202. For example, the base 202 may include one or more recesses 1702 which may be configured to engage with the first bottom surface 402 and second bottom surface 408 of the first leg 208 and second leg 210 respectively. Moreover, the first bottom surface 402 and the second bottom surface 408 may be interlocked within each recess of the one or more recesses 1702 using interlocking techniques explained in FIGS. 15-16.

Figure 18:
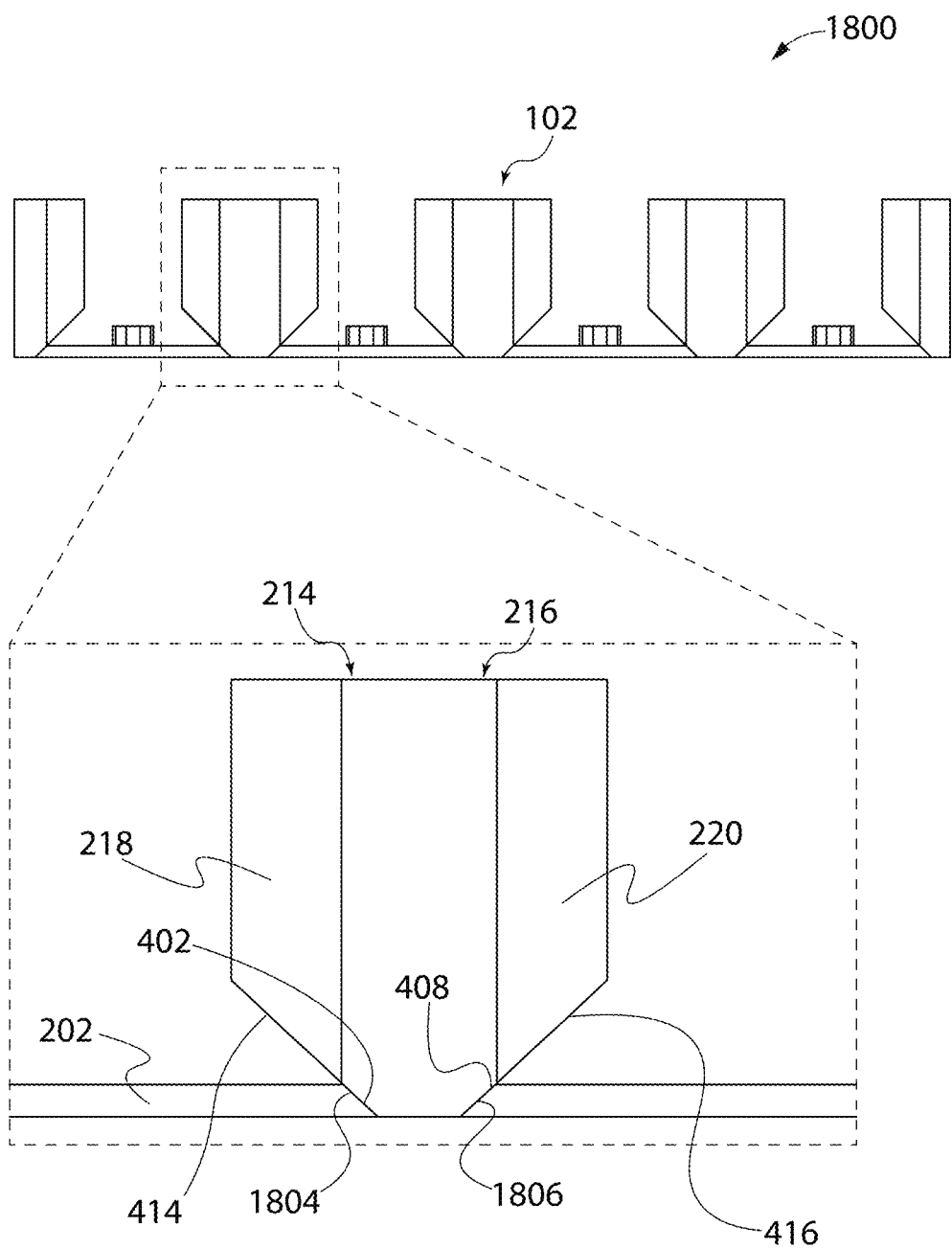
FIG. 18 illustrates a side view of another alternative configuration of the rack.

FIG. 18 illustrates a side view 1800 of another alternative configuration of the rack 102. FIG. 18 is explained in conjunction with FIGS. 1-17. In an alternative configuration, a cutout 1802 with a first angled wall 1804 and a second angled wall 1806 may be formed with the base 202. The first angled wall 1804 may be formed colinear to first inclined bottom 414 of the first plurality of fins 218, and the second angled wall 1806 may be formed colinear to the second inclined bottom 416 of the second plurality of fins 220. Moreover, the first inside surface 404 and the second bottom surface 408 of the first leg 208 and the second leg 210 may be formed as inclined portions corresponding to the first inclined bottom 414, the second inclined bottom 416, the first angled wall 1804 and the second angled wall 1806. As such, in the same configuration, the cutout 1802 may be adjoined and interlocked with the first inclined bottom 414, the second inclined bottom 416 using interlocking techniques explained in FIGS. 15-16.

The methods, systems, devices, graphs, and/or tables are illustrative examples, and configurations may omit, substitute, or add various procedures or components as appropriate. For instance, the methods may be reordered in alternative configurations, and/or various stages may be added, omitted, and/or combined. Alternatively, features described with respect to certain configurations may be in various alternative configurations. Different aspects and elements of the configurations may be combined similarly. Also, technology evolves; thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or more than one (i.e., to at least one) of the grammatical object of the article. By way of example, "an element" means one element or more than one element. "About" and/or "approximately" as used herein when referring to a measurable value such as an amount, a temporal duration, and the like encompass variations of ±20% or ±10%, ±5%, or ±0.1% from the specified value as such variations are appropriate in the context of the systems, devices, circuits, methods, and other implementations described herein. "Substantially," as used herein when referring to a measurable value such as an amount, a temporal duration, a physical attribute (such as frequency), and the like, also encompasses variations of ±20% or ±10%, ±5%, or ±0.1% from the specified value as such variations are appropriate in the context of the systems, devices, circuits, methods, and other implementations described herein.

As used herein, including in the claims, "and" as used in a list of items prefaced by "at least one of" or "one or more of" indicates that any combination of the listed items may be utilized. For example, a list of "at least one of A, B, and C" includes any of the combinations A, B, C, AB, AC, BC, and/or ABC (i.e., A, B, and C). Furthermore, to the extent more than one occurrence or use of the items A, B, or C is possible, multiple uses of A, B, and/or C may form part of the contemplated combinations. For example, a list of "at least one of A, B, and C" may include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed and that the appended claims are intended to be construed to include such variations except as limited by the prior art. While the principles of the disclosure have been provided in connection with specific apparatuses and methods, it is to be clearly understood that this description is made only by way of example and not as a limitation on the scope of the disclosure.

What is claimed is:

1. A support rack configured to support a first electronic device, the support rack comprising:
   a base comprising:
     a base bottom surface; and
     a base top surface oppositely disposed from the base bottom surface;
   a first leg comprising:
     a first bottom surface that is coplanar to the base bottom surface of the base;
     a first inside surface; and
     a first outside surface, oppositely disposed to the first inside surface,
     wherein the first leg protrudes from the first bottom surface above the base top surface of the base;
   a second leg comprising:
     a second bottom surface that is coplanar to the base bottom surface of the base and the first bottom surface of the first leg;
     a second inside surface; and
     a second outside surface, oppositely disposed to the second inside surface;
   a gap defined by space between the first inside surface of the first leg offset from the second inside surface of the second leg;
   a first compliant assembly comprising:
     a first compliant plate comprising:
       a first plate bottom surface that is coplanar to the first bottom surface of the first leg, the second bottom surface of the second leg, and the base bottom surface of the base;
       a first plate surface adjoining the first inside surface of the first leg; and
       a second plate surface oppositely disposed from the first plate surface; and
     a first plurality of fins, each of the first plurality of fins protruding from the second plate surface of the first compliant plate towards the gap,
     wherein the first plurality of fins are integrally formed on the first compliant plate;
   a supporting condition wherein:
     the first plurality of fins are elastically biased towards the first leg via the first electronic device at a first distance from the first leg; and
   an unsupported condition wherein:
     the first plurality of fins are unbiased and at a second distance greater than the first distance from the first leg.

2. The support rack of claim 1 and further comprising:
   a second compliant assembly oppositely disposed to the first compliant assembly, the second compliant assembly comprising:
   a second compliant plate comprising:
     a second plate bottom surface that is coplanar to the first bottom surface of the first leg, the second bottom surface of the second leg, the base bottom surface of the base, and the first plate bottom surface of the first compliant plate;
     a third plate surface adjoining the second inside surface of the second leg; and
     a fourth plate surface oppositely disposed from the third plate surface; and
   a second plurality of fins, each of the second plurality of fins protruding from the fourth plate surface of the second compliant plate towards the gap,
     wherein the second plurality of fins are integrally formed on the second compliant plate; and
   wherein the supporting condition:
     the second plurality of fins are elastically biased towards the second leg via the first electronic device at a third distance from the second leg;
   wherein the unsupported condition:
     the second plurality of fins are unbiased and at a fourth distance greater than the third distance from the second leg.

3. The support rack of claim 1 wherein the first compliant plate is interlockingly formed with the first leg with at least one of:
   a dove-tail joint,
   a transition seam, and
   extrusion layering.

4. The support rack of claim 2, wherein the second compliant plate is interlockingly formed with the second leg with at least one of:
   a dove-tail joint,
   a transition seam, and
   extrusion layering.
5. The support rack of claim 1 and further comprising:
   a first inclined bottom formed on each of the first plurality of fins; and
   a first inclined bottom angle defined between the first inclined bottom and the base top surface of the base,
   wherein the first inclined bottom angle is greater than 20 degrees.
6. The support rack of claim 2 and further comprising:
   a second inclined bottom formed on each of the second plurality of fins; and
   a second inclined bottom angle defined between the second inclined bottom and the base top surface of the base,
   wherein the second inclined bottom angle is greater than 20 degrees.
7. The support rack of claim 1 and further comprising:
   a plurality of openings formed in the base,
      wherein each of the plurality of openings extends between the base bottom surface and the base top surface;
   a plurality of spacers,
      wherein each of the plurality of spacers is located in each of the plurality of openings; and
   a plurality of standoffs, each of the plurality of standoffs formed on each of the plurality of spacers,
      wherein the plurality of standoffs is configured to support the first electronic device away from the base.
8. A supporting method for supporting a first electronic device with a support rack, the supporting method comprising:
   providing a base, comprising:
      a base bottom surface; and
      a base top surface oppositely disposed from the base bottom surface;
   providing a first leg, comprising:
      a first bottom surface that is coplanar to the base bottom surface of the base;
      a first inside surface; and
      a first outside surface oppositely disposed to the first inside surface,
      wherein the first leg protrudes from the first bottom surface above the base top surface of the base;
   providing a second leg, comprising:
      a second bottom surface that is coplanar to the base bottom surface of the base and the first bottom surface of the first leg;
      a second inside surface; and
      a second outside surface oppositely disposed to the second inside surface;
   providing a gap defined by space between the first inside surface of the first leg offset from the second inside surface of the second leg;
   providing a first compliant assembly comprising:
   a first compliant plate comprising:
      a first plate bottom surface that is coplanar to the first bottom surface of the first leg, the second bottom surface of the second leg, and the base bottom surface of the base;
      a first plate surface adjoining the first inside surface of the first leg;
      a second plate surface oppositely disposed from the first plate surface; and
      a first plurality of fins, each of the first plurality of fins protruding from the second plate surface of the first compliant plate towards the gap,
   wherein the first plurality of fins are integrally formed on the first compliant plate; and
   transitioning the first plurality of fins between:
      a supporting condition comprising:
         biasing elastically, the first plurality of fins towards the first leg via the first electronic device at a first distance from the first leg; and
      an unsupported condition comprising:
         unbiasing the first plurality of fins at a second distance greater than the first distance from the first leg.
9. The supporting method of claim 8 and further comprising:
   providing second compliant assembly oppositely disposed to the first compliant assembly, the second compliant assembly comprising:
      a second compliant plate comprising:
         a second plate bottom surface that is coplanar to the first bottom surface of the first leg, the second bottom surface of the second leg, the base bottom surface of the base, and the first plate bottom surface of the first compliant plate;
         a third plate surface adjoining the second inside surface of the second leg; and
         a fourth plate surface oppositely disposed from the third plate surface; and
      a second plurality of fins, each of the second plurality of fins protruding from the fourth plate surface of the second compliant plate towards the gap,
         wherein the second plurality of fins are integrally formed on the second compliant plate and opposite to the first plurality of fins; and
   wherein the supporting condition:
      the second plurality of fins are elastically biased towards the second leg via the first electronic device at a third distance from the second leg;
   wherein the unsupported condition:
      the second plurality of fins are unbiased and at a fourth distance that is greater than the third distance from the second leg.
10. The supporting method of claim 8 and further comprising:
   forming interlockingly, a first compliant plate with the first leg with at least one of:
   a dove-tail joint,
   a transition seam, and
   extrusion layering.
11. The supporting method of claim 9 and further comprising:
   forming interlockingly, the second compliant plate with the second leg with at least one of:
   a dove-tail joint,
   a transition seam, and
   extrusion layering.
12. The supporting method of claim 9 and further comprising:
   providing a first inclined bottom formed on each of the first plurality of fins; and
   providing a first inclined bottom angle defined between the first inclined bottom and the base top surface of the base, wherein the first inclined bottom angle is greater than 20 degrees.

13. The supporting method of claim 9 and further comprising:
   providing a second inclined bottom formed on each of the second plurality of fins; and
   providing a second inclined bottom angle defined between the second inclined bottom and the base top surface of the base,
      wherein the second inclined bottom angle is greater than 20 degrees.

14. The supporting method of claim 8 and further comprising:
   providing a plurality of openings formed in the base,
      wherein each of the plurality of openings extends between the base bottom surface and the base top surface;
   providing a plurality of spacers,
      wherein each of the plurality of spacers is located in each of the plurality of openings; and
   providing a plurality of standoffs, each of the plurality of standoffs formed on each of the plurality of spacers,
      wherein the plurality of standoffs is configured to support the first electronic device away from the base.

* * * * *